United States Patent Office 2,729,567
Patented Jan. 3, 1956

2,729,567

DEHYDRATION OF POTATOES

Edward G. Heisler, Plymouth Meeting, Pa., assignor to the United States of America as represented by the Secretary of Agriculture No Drawing. Application July 8, 1952,
Serial No. 297,802

8 Claims. (Cl. 99—207)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to dehydrated potatoes and processes for their production. By "potatoes" I mean to include both white and sweet potatoes.

An object of this invention is to provide a process for dehydrating potatoes, both raw and cooked, whereby a product of good keeping quality is obtained having a large proportion of the cells intact and which is readily reconstituted by addition of water or suitable aqueous fluid to form a palatable product closely approximating that obtainable from fresh potatoes.

Conventional methods for dehydrating potatoes all suffer one or more of three handicaps: (1) Uneconomical costs; (2) heat damage, producing undesirable color or flavor; or (3) rupture of the potato cells whereby the starch is liberated from the cells. Reconstitution of dried potatoes in which the cells are ruptured yields a glutinous, pasty, unappetizing product. Reconstitution of such dried potato is slow because of its lack of granular structure.

In general according to the present invention either raw or cooked potatoes are dehydrated by mixing them with a dehydrating agent selected from alkanols and ketones having not more than three carbon atoms, ethanol, isopropanol and acetone being preferred. For dehydration by the process, raw potatoes are suitably chopped, diced, sliced or shredded and then mixed with the dehydrating agent to form a slurry, the liquid phase containing the water being then removed from the potatoes. The dehydrated raw potato typically retains the physical form in which it was prepared. If desired, it may be crushed or pulverized after dehydration to speed up the subsequent process of rehydration or reconstitution.

The process of the invention is especially advantageous in the dehydration of cooked potatoes because the product is easily obtained in the form of a fine, free-flowing powder which is readily handled, packaged, stored, and reconstituted. This product is vastly superior to dehydrated, cooked potatoes prepared by conventional processes because (1) it is not visibly discolored, (2) it has no foreign or altered flavor, (3) having practically all fat removed in the dehydration process, it keeps well in storage, even when exposed to air, and does not develop rancidity or undesirable flavor alteration, (4) being in the form of a fine powder, it is instantly rehydrated upon addition of water, and (5) most of the potato cells are retained intact; hence, upon reconstitution it yields a product having the typical desirable texture and consistency obtained from fresh potatoes rather than the pasty, glutinous consistency obtained with potatoes dehydrated by conventional processes in which most of the potato cells are ruptured.

EXAMPLE I

One kilogram of whole white potatoes were cooked by steaming for 35 minutes and was then mashed for 2 minutes during which 2 liters of 95 percent ethanol were added slowly. Slow agitation was continued for 15 minutes. The potato was then filtered by suction from aqueous ethanol and the filter cake was broken up and suspended in 1 liter of 95 percent ethanol. After 15 minutes of slow agitation, the slurry was again filtered by suction.

Again the filter cake was broken up and was air dried while slowly stirring for 15 minutes, during which the wet cake partially dried and gradually crumbled to a fine, free-flowing powder. This powder was further dried on trays in a forced draft oven at 65° C. for 2 hours.

The dehydrated powder, containing relatively coarse fragments of potato skin, was fine enough for 85–90 percent to pass through an 80-mesh screen. The skins and a small amount of lumpy potato were retained on the screen. This lumpy portion could be recycled in the extraction process or it could be crushed to pass through the screen.

Six to 7 percent of the total potato solids of the original potato was dissolved in the aqueous ethanol. The ethanol was recovered by distillation, after which an aqueous solution containing about 2 percent potato solids remained. The dissolved material was recovered by vacuum concentration to about 50 ml. volume and then adding the concentrate back to the cake in the second ethanol extraction. Due to the lower water concentration in this second extraction stage, little of this recovered water-soluble solids was dissolved out in the extraction. In this way the over-all loss of soluble solids can be reduced to any desired level. The flavor of the reconstituted potatoes was somewhat improved by restitution of these recovered water-soluble solids.

While a batch process has been used as a matter of convenience in this and other examples of the practice of my invention, it is obvious that on a commercial scale the most economical manner of operation is to conduct the extraction by continuous counter-current movement of the potatoes and the solvent. In this way the out-going dehydrated potatoes are contacted with fresh solvent and at the same time the out-going solvent is contacted with in-coming fresh potatoes and so picks up its maximum allowable capacity of water. Only in this way can maximum use be made of the solvent, thus keeping the required volume of solvent to a minimum.

The maximum allowable moisture content of the potatoes and the solvent as they leave the solvent extraction process will vary somewhat depending on the solvent used, whether batchwise or continuous operation is practical, and whether the potato is separated from the aqueous solvent by filtration, sedimentation, centrifugation, or other means. In the two-step batch process used in Example I where ethanol is the solvent and separation is by filtration, the ethanol-water mixture should contain at least 50 percent of alcohol, otherwise filtration is very slow. Similarly, sedimentation is much slower when the ethanol content is below 50 percent. In the second stage of this extraction, the ethanol content should be at least 80 percent in order to leave a cake that is readily disintegrated by slow stirring to produce a loose powder easily dried and passing through an 80-mesh screen after drying. If the ethanol content is much below 80 percent, the cake is likely to be slightly sticky and to be lumpy after drying. The following table shows the effect of the concentration of the final ethanol extract on the yield of screened powder.

Table I

| Percent ethanol | Percent of potato passing screen | |
|---|---|---|
| | 30-mesh | 80-mesh |
| 63 | 41 | 10 |
| 67 | 55 | 43 |
| 71 | 60 | 50 |
| 85 | 88 | 70 |
| 88 | 93 | 82 |
| 90 | 94 | 84 |

EXAMPLE II

The procedure of Example I was repeated except that acetone was used as the solvent instead of ethanol. The product obtained was the same as that of Example I. It was noted that acetone was less efficient than ethanol at concentrations below about 80 percent, and that it was about equally efficient at higher concentrations. This is shown by the data in Table II, below, which may be compared to those in Table I.

Table II

| Concentration of acetone, percent | Percent of potato passing screen | |
|---|---|---|
| | 30-mesh | 80-mesh |
| 70 | 25 | 6 |
| 75 | 52 | 42 |
| 83 | 89 | 83 |
| 92 | 92 | 87 |

EXAMPLE III

The procedure of Example I was repeated except that ethanol was replaced with isopropyl alcohol. The product obtained was identical with that of Example I. It was noted that isopropyl alcohol was less efficient than either ethanol or acetone at all concentrations above 75 percent. This may be seen by comparing the data of Table III, below, with those of Tables I and II.

Table III

| Concentration of isopropyl alcohol, percent | Percent of potato passing screen | |
|---|---|---|
| | 30-mesh | 80-mesh |
| 75 | 53 | 44 |
| 92 | 65 | 46 |
| 93 | 68 | 48 |
| 97 | 89 | 70 |

EXAMPLE IV

One kilogram of shredded raw white potatoes was stirred 15 minutes with 2 liters of 95 percent ethanol. The solvent was removed by filtration and then 1 liter of fresh 95 percent ethanol was stirred for 15 minutes with the potatoes. The potatoes were then recovered by filtration and dried on trays in a forced draft oven at 65° C. for 2 hours.

The product retained the shredded form but was readily reduced to a powder by passage through a hammer mill.

This product is particularly useful as animal feed and for making sirups, dextrins, glues, and other industrial starch products.

I claim:

1. The process of preparing full-flavored dehydrated potatoes in the form of a free-flowing powder comprising mixing cooked, mashed, white potatoes with ethanol to form a slurry, separating the liquid phase containing removed water from the potatoes, recovering the dissolved solids from the separated liquid phase, incoporating said recovered solids into the potatoes, and then air drying while stirring the potatoes until a free flowing powder is formed.

2. The process of dehydrating potatoes comprising mixing potatoes with a dehydrating agent to form a slurry, said agent being selected from the class consisting of ethanol, isopropanol and acetone, to remove water from the potatoes, and then separating the liquid phase containing the removed water from potatoes.

3. The process of claim 2 wherein the potatoes are white potatoes.

4. The process of claim 2 wherein the potatoes are cooked white potatoes.

5. The process of claim 2 wherein the dehydrating agent is ethanol.

6. The process of claim 2 wherein the dehydrating agent is acetone.

7. The process of claim 2 wherein the dehydrating agent is isopropanol.

8. The process of claim 4 wherein the dehydrating agent is ethanol.

References Cited in the file of this patent

UNITED STATES PATENTS

| | | |
|---|---|---|
| 1,934,677 | Ash | Nov. 14, 1933 |
| 2,358,869 | Maurer et al. | Sept. 26, 1944 |
| 2,420,517 | Brandner et al. | May 13, 1947 |
| 2,522,560 | Benard | Sept. 19, 1950 |
| 2,572,761 | Rivoche | Oct. 23, 1951 |